Sept. 25, 1934. C. J. ST. MARTIN 1,974,882
SAW FILING MACHINE
Filed April 21, 1931 6 Sheets-Sheet 3
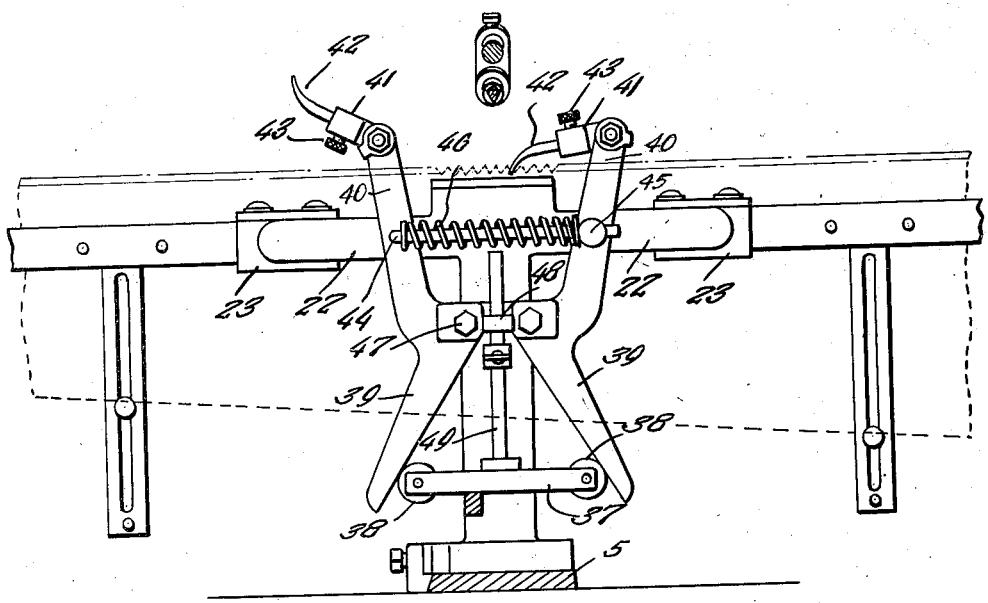
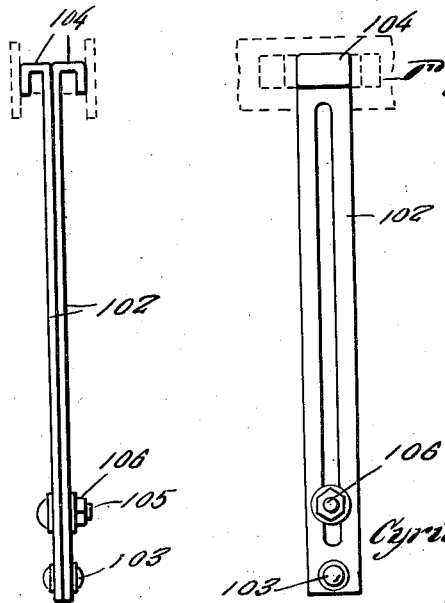
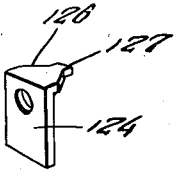
Inventor
Cyril J. St. Martin
By Clarence A. O'Brien
Attorney Sept. 25, 1934.  C. J. ST. MARTIN  1,974,882
SAW FILING MACHINE
Filed April 21, 1931   6 Sheets-Sheet 4

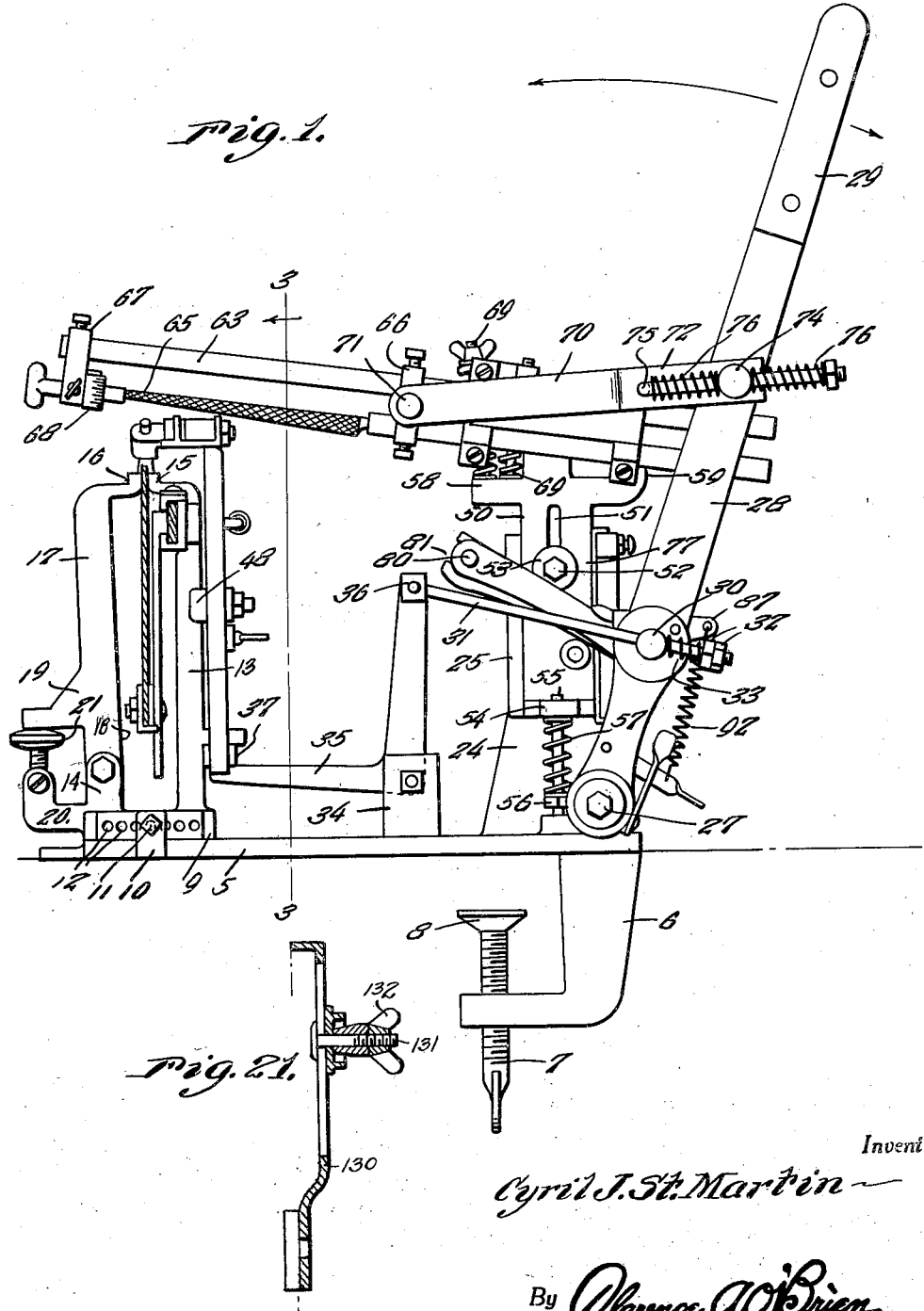

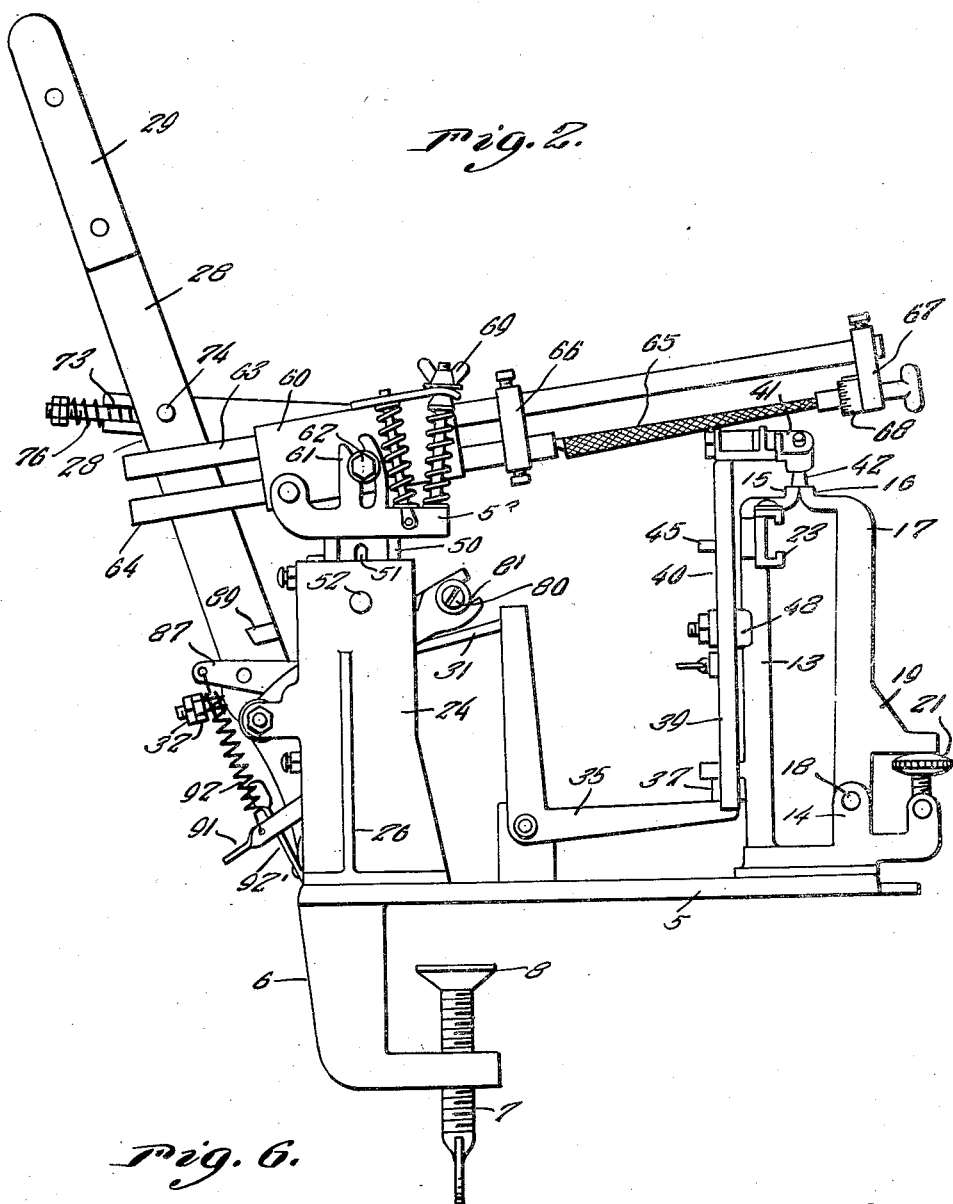

Inventor
Cyril J. St. Martin

By Clarence A. O'Brien
Attorney

Sept. 25, 1934.　　　C. J. ST. MARTIN　　　1,974,882
SAW FILING MACHINE
Filed April 21, 1931　　6 Sheets-Sheet 5
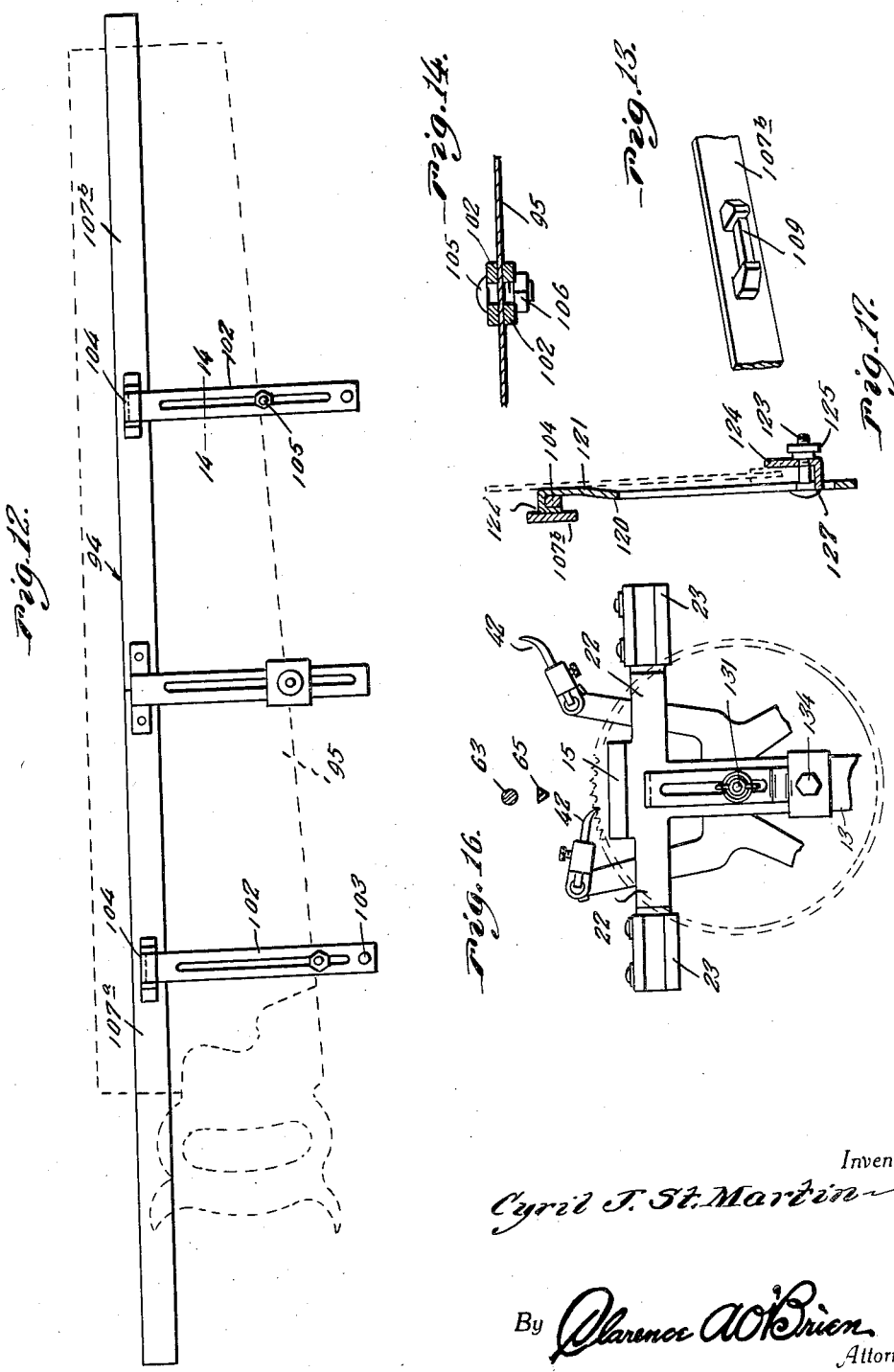
Inventor
Cyril J. St. Martin
By Clarence A. O'Brien
Attorney Sept. 25, 1934.   C. J. ST. MARTIN   1,974,882
SAW FILING MACHINE
Filed April 21, 1931   6 Sheets-Sheet 6

Inventor
Cyril J. St. Martin

By Clarence A. O'Brien
Attorney

Patented Sept. 25, 1934

1,974,882

UNITED STATES PATENT OFFICE 1,974,882

SAW FILING MACHINE

Cyril J. St. Martin, Karnak, Ill.

Application April 21, 1931, Serial No. 531,773

1 Claim. (Cl. 76—33)

This invention relates to new and useful improvements in saw filing machines, and the principal object of this invention is to provide a machine whereby saws may be sharpened in a quick and accurate manner.

Another important object of the invention is to provide a machine which performs numerous functions in an automatic and foolproof manner.

Still another important object of the invention is to provide a saw filing machine which is of simple construction and convenient to handle.

These and numerous other important objects and advantages of the invention will become apparent to the reader of the following specification and claim.

In the drawings:—

Figure 1 represents a side elevational view of the machine.

Fig. 2 is a side elevational view of the machine looking at the opposite side from that shown in Fig. 1.

Fig. 3 represents a vertical sectional view taken substantially on the line 3—3 of Fig. 1.

Fig. 6 represents the perspective view of one of the saw feed claws.

Fig. 9 represents an end elevation of one of the saw clamps.

Fig. 10 represents a side elevational view of one of the saw clamps.

Fig. 11 represents a perspective view of the detachable element for the structure shown in Fig. 20.

Fig. 12 represents a side elevational view of the saw carrier adapted for the hand type saw shown in dotted lines.

Fig. 13 represents a fragmentary perspective view of the carrier shown in Fig. 12 to disclose one of the stirrups.

Fig. 14 represents a cross sectional view taken substantially on line 14—14 of Fig. 12 disclosing the clamps for the type of saw shown in Fig. 12.

Fig. 16 represents an elevational view disclosing the means for mounting a rotary or circular saw.

Fig. 17 represents a vertical sectional view through a mitre saw support showing the special clamp means mounted upon the carrier bar shown in Fig. 12.

Figure 18:
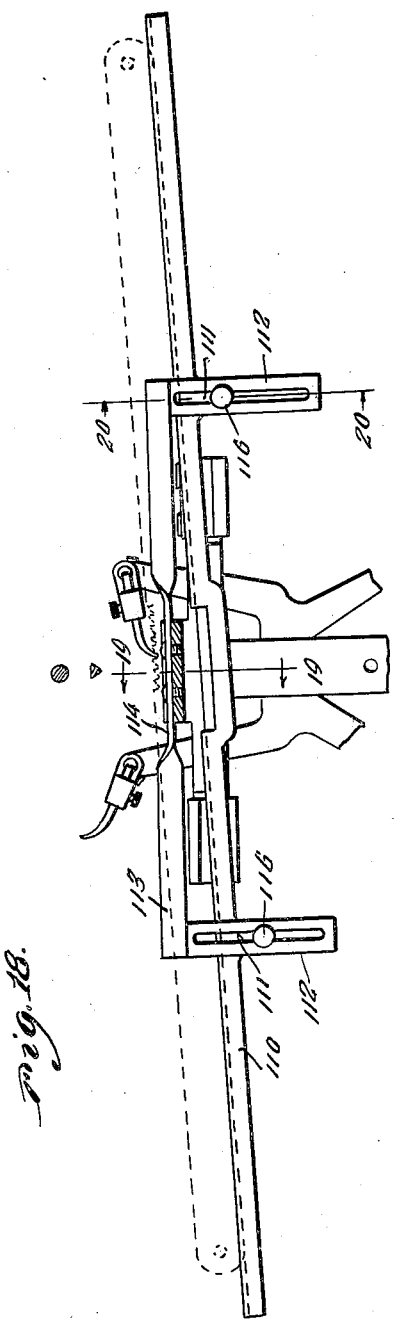
Fig. 18 represents an irregular vertical sectional view through the structure shown in Fig. 19, showing the carrier especially devised for hack saw blades.
Figure 19:
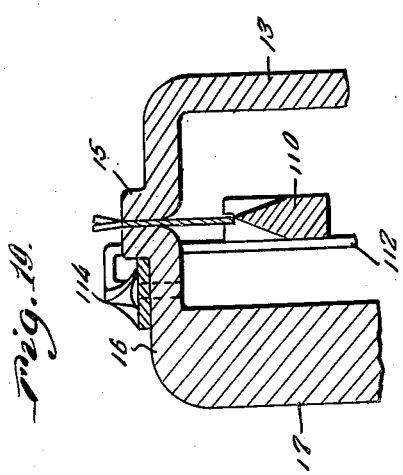

Fig. 19 discloses a sectional view taken substantially on line 19—19 of Fig. 18.

Figure 20:
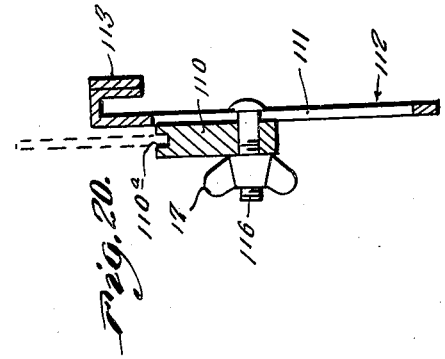

Fig. 20 represents a vertical sectional view taken substantially on line 20—20 of Fig. 18.

Fig. 21 represents a further vertical sectional view through another attachment for holding saws of the circular type.

Referring to the drawings wherein like numerals designate like parts, it can be seen that the novel machine includes a base 5 from which depends the L-shaped member 6 having a clamp screw 7 feedable upwardly through the horizontal portions thereof. This screw 7 has a head 8 which can be urged against the bottom side of a working bench, table, or the like, when the machine is to be set up for use.

Disposed upon one end of the base 5 is the block 9 which is adjustably secured to the base 5 by the lug 10 having the screw 11 engageable into any one of the threaded openings 12 on the block. Extending upwardly from one end of the block 9 is the post 13 and upstanding from the opposite end of the block 9 is the stub 14. The upper end of the post 13 is provided with a stationary vice jaw 15 while its complementary jaw 16 is supported by the leg 17 pivotally connected to the stub 14 as at 18. This leg 17 is provided with a laterally extending protuberance 19 and interposed between this protuberance 19 and the protuberance 20 on the stub 14 is the adjustment 21, permitting the leg 17 to be swung toward or away from the jaw 15.

From each end of the jaw 15 extends an arm 22 equipped at its outer end with a swingable guide 23. In these guides 23—23, are slidable any one of the saw carriers, which will be described fully hereinafter.

Extending upwardly from the base plate 5 at the opposite end thereof from the block 9 is the standard 24 provided with a vertically extending dove-tailed guide 25 at one side thereof, (see Fig. 1.) The other side of the standard 24 is provided with suitable reinforcing means 26.

Swingably secured to the base 5 as at 27 is the actuating lever 28 provided with the handle 29 at the upper end thereof. This lever 28 has a stud 30 on the outer side thereof, through which extends the rod 31. The outer end of this rod is threaded to receive the nut 32 and interposed between the nut and the stud 30 is the compressible spring 33.

The boss 34 on the intermediate portion of the base 5 rockably supports the bell crank 35. The upper end of the bell crank 35 is pivotally connected as at 36 to the inner end of the rod 31.

The remaining end portion of the bell crank 35 bears against the under side of the horizontally disposed vertically movable bar 37, carrying a roller 38 at each end thereof. These rollers 38 ride against the inner sides of the obliquely disposed legs 39 on the bars 40—40. The upper end of each bar 40 is provided with a swingable socket 41 in which a claw 42 is engageable and retained by a set screw 43.

These sockets 41 can be swung to inoperative position depending upon which direction the saw is to be moved. One or the other of these claws 42 can be swung downwardly to engage the teeth of the saw so that the saw can be shifted through the vice as the teeth are filed.

A rod 44 has one end secured to one of the bars 40, while its opposite end is slidable thru an apertured stud 45 on the complementary bar 40 and interposed between the first-mentioned end of this rod 44 and the stud 45 is a compressible coiled spring 46.

Numeral 47 represents the fulcrum for the bars 40 and on this fulcrum structure is a guide 48 for slidably receiving the guide rod 49 projecting upwardly from the intermediate portion of the horizontal bar 37.

Obviously, as the bell crank 35 is rocked, the bar 37 will be raised and lowered to actuate whichever claw 42 is engaged with the saw teeth.

The file carriage includes a vertically slidable plate 50 having its edge portions engaged in the dove-tailed guide 25 and being provided with a longitudinally extending slot 51 therein for receiving the screw 52, which extends through the washer 53, slot 51, and into the standard 24. The lower end of this plate 50 is equipped with a laterally disposed lug 54 which is apertured to receive the upstanding guide rod 55, extending upwardly from the support.

Interposed between an adjustable nut 56 on this rod 55 and the lug 54, is a compressible coiled spring 57. This spring 57 serves to normally maintain the plate 50 in an elevated position.

The upper end of the plate 50 is provided with a T-head 58, one end portion of which is disposed upwardly as at 59 and to this end of the T-head 58 is swingably secured the block 60.

Slidable in the arcuately slotted lug 61 on the T-head 58 is the projection 62 on the aforementioned block 60. Slidable through the block 60 are the rods 63 and 64, the rod 63 being substantially longer than the rod 64. The inner end of the rod 64 is provided with a socket to receive the shank end of a file 65. A connector 66 secures the inner end of the rod 64 to the intermediate portion of the rod 63, while a second connector 67 connects the outer end of the rod 63 to the chuck 68 for engaging the outer end of the file 65.

Adjustable spring tensioning means 69 is interposed between the T-head 58 and the block 60, so as to normally tend to maintain the carriage in a slightly inclined position with respect to the transverse axis of the plate 50, and at the same time affording cushioning means.

As is clearly shown in Fig. 1, an elongated connecting bar 70 has one end secured to the connector 66 as at 71, while its offset end portion 72 is slotted as at 73 to receive the stud 74 on the lever 28. A rod 75 extends from a point on the offset portion 72 of the connecting bar 70 longitudinally of the connecting rod in an outward direction and through an aperture in the stud 74, thus securing the slotted end portion of the bar to the lever 28.

Equalizing springs 76—76 are provided on the rod 75 at the opposite side of the stud 74. Obviously, by swinging the lever 28, the rods 63 and 64 will be reciprocated through the block 60. The following description relates to the means for lowering the file carriage, so that the file will engage the teeth of the saw.

A vertically adjustable plate 77 on one side of the plate guide 25, swingably supports the link 78 at its lower end as at 79. The upper end of this link 78 is provided with a stud 80 for disposition through the slot 81 in the upper end of the link 82, which has its lower end pivotally connected to the plate 77 as at 83. Projecting laterally from the link 78 is a boss 84 having its top surface curved upwardly.

Figure 4:
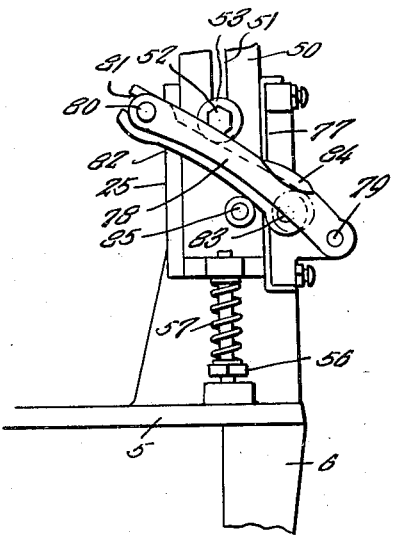
Fig. 4 represents a fragmentary side elevational view looking at the same side of the machine shown in Fig. 1, and with the operating lever removed.
Figure 5:
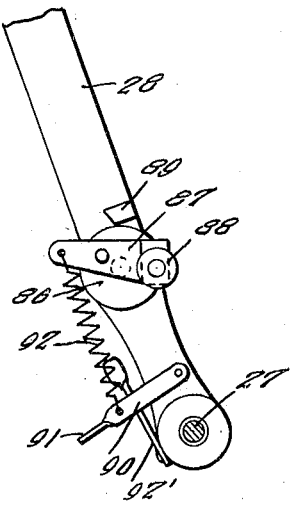
Fig. 5 represents a fragmentary inside elevational view of the actuating lever, showing the cam means for lowering the file carriage.
Figure 7:
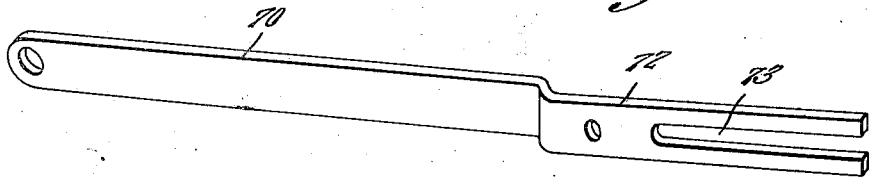
Fig. 7 represents a perspective view of the file carriage connecting bar.
Figure 8:
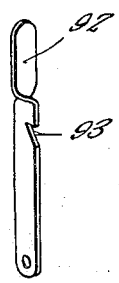
Fig. 8 represents a perspective view of the catch for the cam spring.
Figure 15:
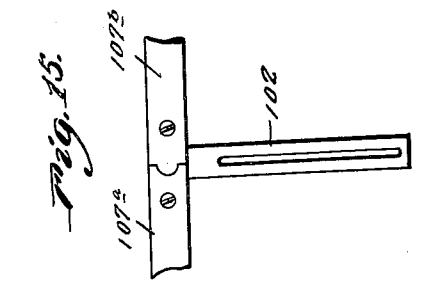
Fig. 15 represents a fragmentary elevational view of the intermediate portion of the carrier shown in Fig. 12, disclosing the joint between the sections thereof.

It will be observed in Fig. 4, that a stud 85 projects outwardly and against this the link 82 normally rests. Now referring to Fig. 5, it can be seen that on the inner side of the lever 28 is a disk 86 carrying a rockable arm 87 eccentrically connected thereto. One end of this rockable member 87 carries a roller 88 for engagement against the top side of the boss 84. Numeral 89 represents a stop for the rockable member 87.

A swingable member 90 having a finger tip 91 thereon is carried by the lower end portion of the lever 28 and interposed between this swingable member 90 and the opposite end of the rockable member 87 is a coiled spring 92. A swingable catch member 92' is also provided on the lever 28 and is engageable with the member 90 so that the notch 93 in the former will receive the swingable member 91 so as to retain the same in a position tensioning the spring 92. However, by releasing this fastener, the swingable member 90 can be elevated so that the tension of the spring is released, thus permitting the roller 88 to be lowered out of engagement with the boss 84.

It can now be seen, that as the lever 28 is swung in operating the carriage, and in operating the saw feed, the roller 88 on the lever will ride against the boss 84 so as to swing the links 78 and 82 downwardly. The link 82 riding against the stud 85 will force the plate 50 downwardly, thus lowering the carriage to a position so that the file 65 will bear against the tooth of the saw to be sharpened.

Fig. 12 represents the carrier for the hand type of saw shown in dotted lines and is generally referred to by numeral 94.

Figs. 9 and 10 show the saw clamps of the carrier, two or more of which are provided for each saw. Each of these clamps includes a pair of slotted bars 102—102, swingably connected together as at 103. Between these bars 102—102, the saw 95 is engaged, and as shown in Fig. 9, the upper end of each bar 102 is bent backwardly to provide a hook 104.

Slidable in the registering slots of the bars 102—102 is the bolt 105 equipped with the nut 106. Thus it can be seen, that with the saw engaged in the clamps, and these clamps hooked over the stirrups 109 of the carrier rails 107a—107b, the saw will be held in a stable manner. The extent to which the toothed edge of the saw is to project upwardly above the rails 107a—107b being determined by adjustment of the bolts 105 in the slots of the bars 102, the saw resting upon these bolts in the manner apparent in Fig. 12. Each of the stirrups 109 is provided with a pair of closely spaced lugs 108—108 connected by an apertured bridge piece and obviously, the hooks of the clamps engage between the lugs 108—108 to prevent longitudinal shifting of the saw on the carrier.

The rails 107a—107b engage in the swingable guides 23 (see Fig. 3) so that the carrier is freely slidable between the post 13 and leg 17 shown clearly in Fig. 1. Figs. 18, 19 and 20 disclose another attachment for holding meat and hack saw blades. This carrier attachment includes an elongated blade rest 110 provided with depending ears 111—111. A pair of slotted bars 112—112 are each connected at one of their ends to a corresponding end of a strap 113 which has its intermediate portion twisted to a right angular plane as at 114. Bolts 116 extend through the slots of the bars 112—112, and through the rests 110 for adjustably supporting the rests on the bars 112—112. The intermediate portion of the rod 110 is grooved as at 110a to receive a hack saw blade and offset as at 118 and beveled to facilitate removal of the blade when desired.

The intermediate portion 114 of the strap 113 is provided with openings 119 to accommodate securing elements whereby the strap can be secured to the jaw 16 of the vise shown in Fig. 1. Of course, the saw carrier 94 must be first removed before the attachment shown in Fig. 17 can be employed.

Fig. 17 discloses another attachment which is employed in place of the clamps shown in Figs. 9 and 10. This form of clamp is used where the saw is equipped with a thick heavy back reinforcement, as clearly seen in Fig. 17 (in dotted lines), and the clamp includes a slotted bar 120 provided with an offset upper end portion 121 equipped with a backwardly disposed hook 122 for engagement over the corresponding stirrup 109, (see Fig. 13.)

Slidable in the slot of the bar 120 is the bolt 123 which extends through the L-shaped clamp plate 124 and is equipped with a nut 125. This clamp plate 124 is provided with a lug 126 from which projects the tongue 127 for disposition into the slot of the bar 120.

Thus the back of the saw can be engaged between the plate 124 and the bar 120, with the hook 122 engaged over the stirrup 107 of the carrier 94, while the toothed edge portion of the saw tensionally bears against the offset portion 121 of the bar 120.

Figs. 16 and 21 disclose means for mounting a circular saw for sharpening, and this includes a slotted bar 130, through the slot of which extends a bolt 131 equipped with a nut 132. This bolt extends through the circular saw 133 (shown in dotted lines in Fig. 16) and thus rotatably supports the saw. A screw 134 secures the lower offset end of the bar to the inner side of the post 13 which has the jaw 15 at its upper end. The upper end of the bar 130 is provided with a lateral lug 135 which bears against the post 13.

Having thus described my invention, what I claim as new is:—

In a saw sharpening machine, a base, an upstanding member having a horizontally disposed and grooved guide thereon and a saw engaging jaw at its upper end, an upstanding member pivotally connected to said base and having a saw engaging jaw at its upper end opposed to said first mentioned jaw, means for adjusting the pivotal upstanding member toward the other upstanding member whereby a saw can be clamped between said jaws, a saw carrying carriage, said carriage consisting of a rail slidably disposed in the said guide and provided with laterally disposed stirrups, hanger members depending from said stirrups, and clamp members on the said hanger members for securing the back edge of a saw to said hanger members, said hanger members being detachably connected with said stirrups.

CYRIL J. ST. MARTIN.